(12) United States Patent
Knight

(10) Patent No.: US 6,846,408 B2
(45) Date of Patent: Jan. 25, 2005

(54) FILTER ASSEMBLY FOR A CONTROL VALVE IN A VEHICULAR BRAKE SYSTEM

(75) Inventor: Gary R. Knight, Woodhaven, MI (US)

(73) Assignee: Kelsey-Hayes Company, Livonia, MI (US)

( * ) Notice: Subject to any disclaimer, the term of this patent is extended or adjusted under 35 U.S.C. 154(b) by 130 days.

(21) Appl. No.: 10/384,112

(22) Filed: Mar. 7, 2003

(65) Prior Publication Data

US 2004/0173519 A1 Sep. 9, 2004

(51) Int. Cl.$^7$ ............................................. B01D 35/02
(52) U.S. Cl. ........................ 210/171; 210/429; 210/432; 210/495; 137/550; 303/119.2
(58) Field of Search ................................. 210/171, 429, 210/432, 453, 460, 495; 137/544, 550; 303/119.2

(56) References Cited

U.S. PATENT DOCUMENTS 5,803,556 A * 9/1998 Weis et al. ............... 303/119.2
6,254,199 B1 * 7/2001 Megerle et al. .......... 303/119.2

* cited by examiner

Primary Examiner—Matthew O. Savage
(74) Attorney, Agent, or Firm—MacMillan, Sobanski & Todd, LLC (57) ABSTRACT

A filter assembly for a control valve for controlling fluid flow in a hydraulic control unit of a vehicular brake system includes a substantially annular filter body. The body has an inner surface, an outer surface, a first end, and a second end. The inner surface defines an axial bore from the first end to the second end of the body. A portion of the axial bore adjacent the first end receives a portion of a valve body. The filter body is disposed within a bore of a housing. The outer surface defines a first axial groove. The housing contains a valve. The first end of the filter body defines a first radially extending groove which extends between the axial bore and the first axial groove. A filter portion is disposed within the axial bore for filtering fluid flowing through the axial bore.

26 Claims, 6 Drawing Sheets

FILTER ASSEMBLY FOR A CONTROL VALVE IN A VEHICULAR BRAKE SYSTEM

BACKGROUND OF THE INVENTION

This invention relates to vehicular brake systems, and more particularly to an improved control valve mounted in a hydraulic control unit of an electronically controlled brake system.

Electronically controlled brake systems for vehicles are well known. One type of electronically controlled brake system includes a hydraulic control unit (HCU) connected in fluid communication between a master cylinder and a plurality of wheel brakes. The HCU typically includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby permitting or blocking fluid flow through the valve, respectively. A coil assembly is provided about the sleeve. When the valve is energized, an electromagnetic field or flux generated by the coil assembly causes the armature to slide from the biased open or closed position to a closed or open position, respectively.

Control valves mounted in a HCU are actuated by an electronic control module to provide desired braking functions such as anti-lock braking (ABS), a slip or traction control event, and vehicle stability control.

To provide desired braking responses, fluid flow must be maintained from the wheel brakes to the master cylinder during all fluid pressure conditions during brake release. During an ABS event, a high volume of fluid at a high pressure at the brake can create a high fluid release condition. To provide the desired braking responses during such a high fluid release condition, fluid flow must also be maintained from the wheel brakes to the master cylinder.

SUMMARY OF THE INVENTION

This invention relates to a filter assembly for a control valve for controlling fluid flow in a hydraulic control unit of a vehicular brake system. The filter assembly includes a substantially annular body having an inner surface, an outer surface, a first end, and a second end. The inner surface defines an axial bore from the first end to the second end of the body. A portion of the bore adjacent the first end receives a portion of a valve body. The outer surface of the body engages a portion of a housing and defines a first axial groove. The housing contains a valve. The first end of the body defines a first radially extending groove which extends between the axial bore and the first axial groove. A filter portion is disposed within the axial bore for filtering fluid flowing through the axial bore.

DETAILED DESCRIPTION OF THE INVENTION

Figure 1:
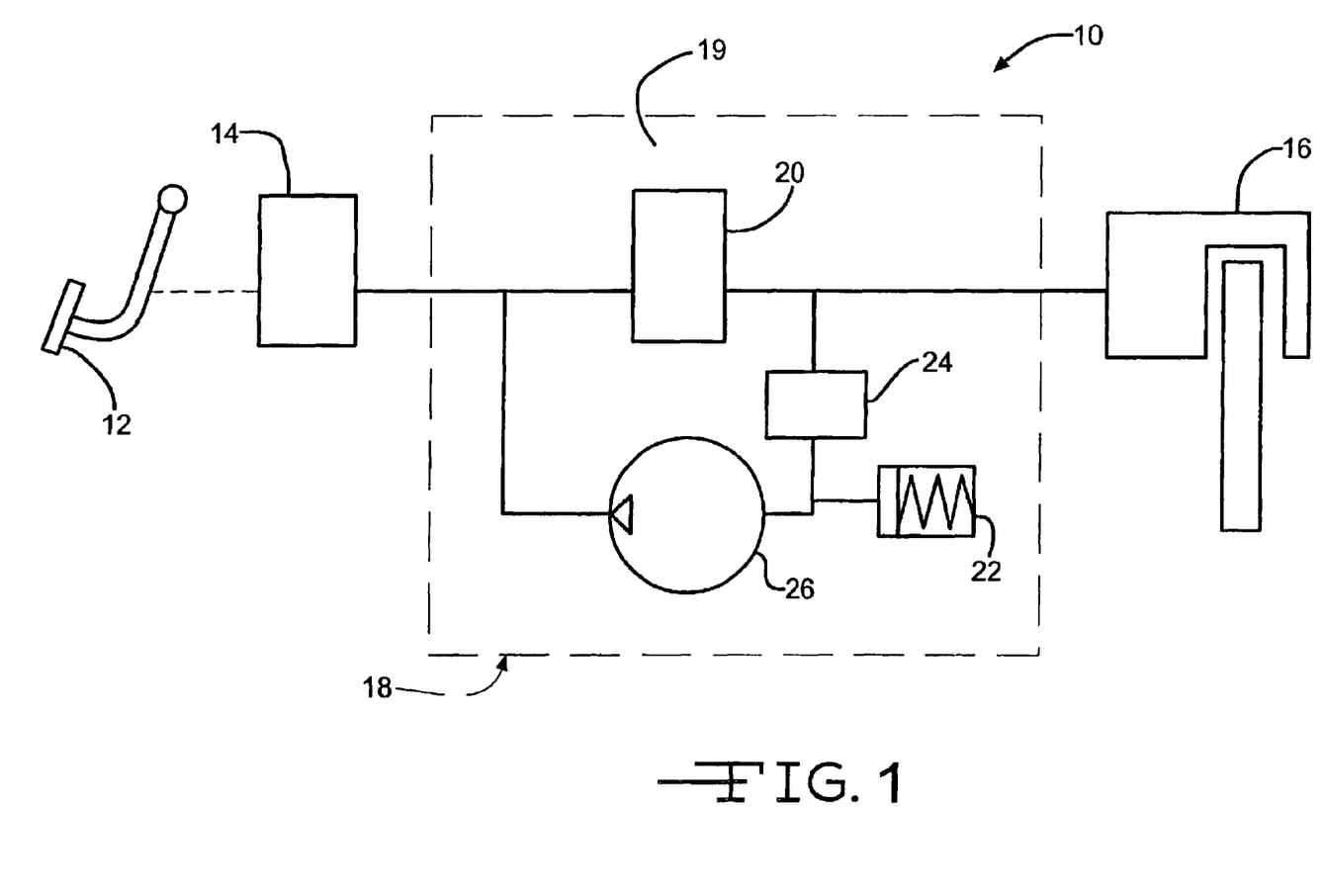
FIG. 1 is a schematic diagram of a vehicular braking system according to the present invention illustrating a hydraulic control unit having a normally open control valve, a normally closed control valve, an accumulator, and a pump.

An exemplary vehicular brake system having a valve according to this invention is indicated generally at 10 in FIG. 1. The brake system 10 includes valves and other components described below to provide an anti-lock braking function. In other embodiments, brake system 10 can also include components to provide traction control and/or vehicle stability control functions. In yet other embodiments, brake system 10 can be formed as an electronic brake management system.

The exemplary brake system 10 includes a brake pedal 12 connected to a master cylinder 14 for providing pressurized brake fluid to a plurality of wheel brakes 16, only one of which is shown. The wheel brake 16 is schematically illustrated as a disc brake. However, the wheel brake 16 may be any type of wheel brake found on vehicles, including a drum brake.

The brake system 10 also includes a hydraulic control unit (HCU) 18 connected in fluid communication between the master cylinder 14 and the wheel brake 16. The HCU 18 includes a housing 19 having bores for receiving control valves and other components described below. Fluid conduits are provided between the bores to provide fluid communication between the valves and other components. For purposes of clarity of illustration, only one set of components is illustrated in FIG. 1. Typically, however, the HCU 18 also houses corresponding components for other brake circuits and/or wheels of the vehicle.

The HCU 18 preferably includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 having an inlet connected to the low pressure accumulator 22, and a pump discharge connected to the fluid conduit between the master cylinder 14 and the control valve 20. The HCU 18 may also include other fluid flow devices such as an attenuator, restricted orifices, and check valves (none of which are illustrated), depending upon the system design. The control valve 20 is preferably formed as a solenoid valve switchable between two positions. The control valve 24 is also preferably formed as a solenoid valve switchable between an open and a closed position. The valves 20 and 24, as well as the pump 26, are electrically connected to an electronic control module (not illustrated) and operated to provide desired system braking in a well-known manner.

Figure 5:
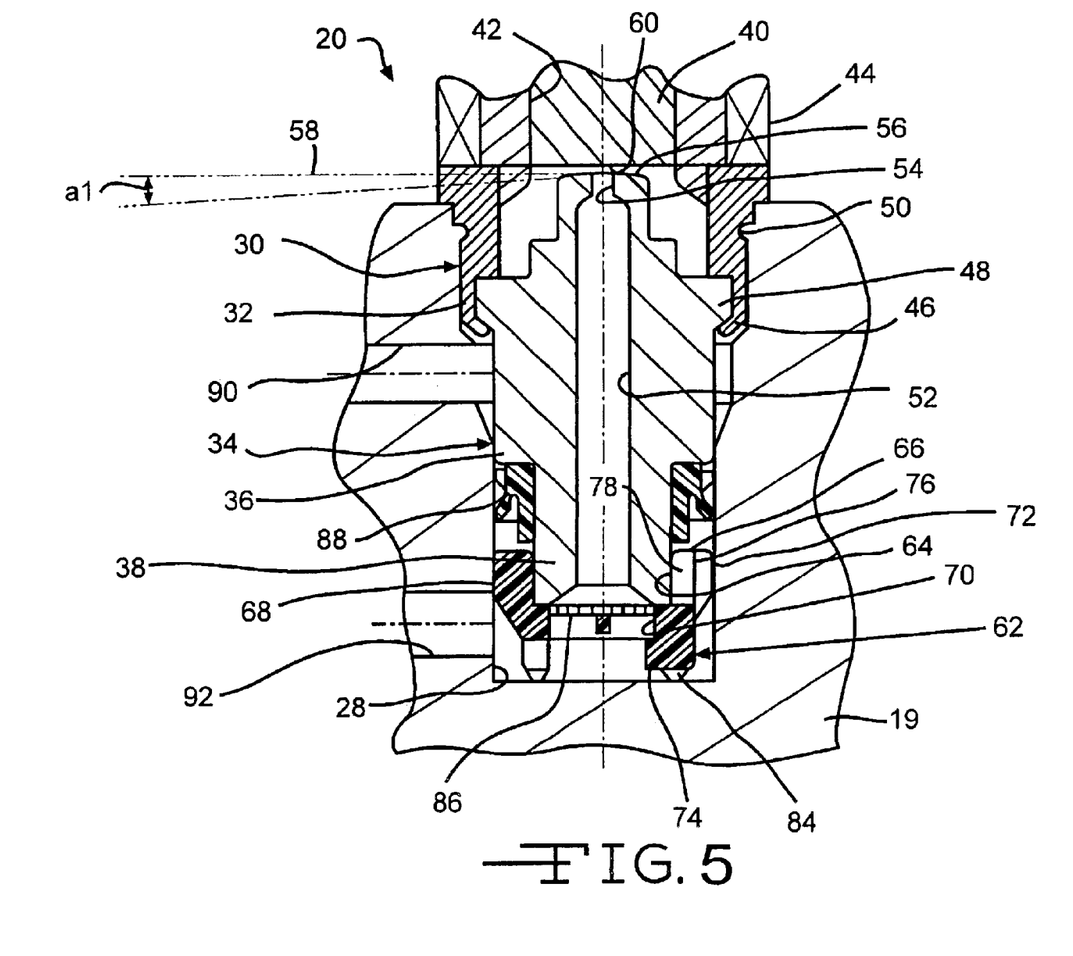
FIG. 5 is a cross sectional view taken along line 5—5 of FIG. 4, illustrating the normally open control valve and showing the filter assembly according to the invention.

A sectional view of a portion of the control valve 20 is illustrated in FIG. 5. The control valve 20 is received in a bore 28 formed in the housing 19. The control valve 20 preferably includes a valve body 30 having a first body portion or sleeve 32 and a second body portion or valve seat 34. The valve seat 34 includes a body portion 36 and a reduced diameter portion 38.

The control valve 20, being a normally open control valve, further includes an armature 40 slidably received in a bore 42 of the sleeve 32, and biased away from the valve seat 34 when the control valve 20 is not energized. A coil assembly 44 is disposed about the sleeve 32. When the coil assembly 44 is energized to produce an electromagnetic field, the armature 40 is pulled toward the valve seat 34 to prevent fluid flow through the valve 20.

The armature 40 is disposed at an extreme of travel away from the valve seat 34 when the coil assembly 44 is deenergized such that the control valve 20 is in an open position, as shown in FIG. 5. A spring (not shown) preferably engages the armature 40 to urge the armature 40 away from the valve seat 34 when the control valve 20 is in the open position. When the coil assembly 44 is energized, the armature 40 is disposed at an extreme of travel toward the valve seat 34, such that the control valve 20 is in a closed position. When the control valve 20 is in the closed position, fluid flow through the control valve 20 is blocked. When the control valve 20 is in the open position, fluid flow through the control valve 20 is not blocked.

An annular portion 46 adjacent an open end of the sleeve 32 is crimped onto a radially outwardly extending flange 48 formed on the valve seat 34. Preferably, the sleeve 32 is retained within the bore 28 by clinching, wherein material of the housing 19 is forced into a groove 50 formed in the outer surface of the sleeve 32, as shown in FIG. 5. The combined sleeve 32 and valve seat 34 can also be retained in the bore 28 by any desired mechanical or chemical means operative to retain the sleeve 32 within the bore 28.

The valve seat 34 includes a longitudinal (preferably axial) fluid passage 52 that terminates in a reduced diameter bore 54. A seat 56 is formed on an outer surface of the valve seat 34. If desired, the seat 56 can have an angle. Preferably, the seat 56 has an angle a1 within the range of from about three degrees to about five degrees, as measured from a plane 58 perpendicular to an axis of the fluid passage 52. More preferably, the seat 56 has an angle a1 of about four degrees. An end surface 60 of the armature 40 acts as a valve sealing element and engages the seat 56 when the armature 40 moves downwardly. When the end surface 60 engages the seat 56, the fluid passage 52 is blocked.

A filter assembly 62 can be provided adjacent an inlet of the fluid passage 52. Preferably, the reduced diameter portion 38 of the valve seat 34 is disposed within a portion of an axial bore 64 adjacent a first end 66 of the of the filter assembly 62. More preferably, the axial bore 64 maintains an interference fit with the reduced diameter portion 38 of the valve seat 34.

A lip seal 88 can be provided about the reduced diameter portion 38 of the valve seat 34, for sealing between the valve seat 34 and the bore 28 of the housing 19. Preferably, the lip seal 88 is further disposed between the body portion 36 of the valve seat 34 and the filter assembly 62. It will be appreciated that any other desired type of fluid sealing means can also be used.

Figure 2:
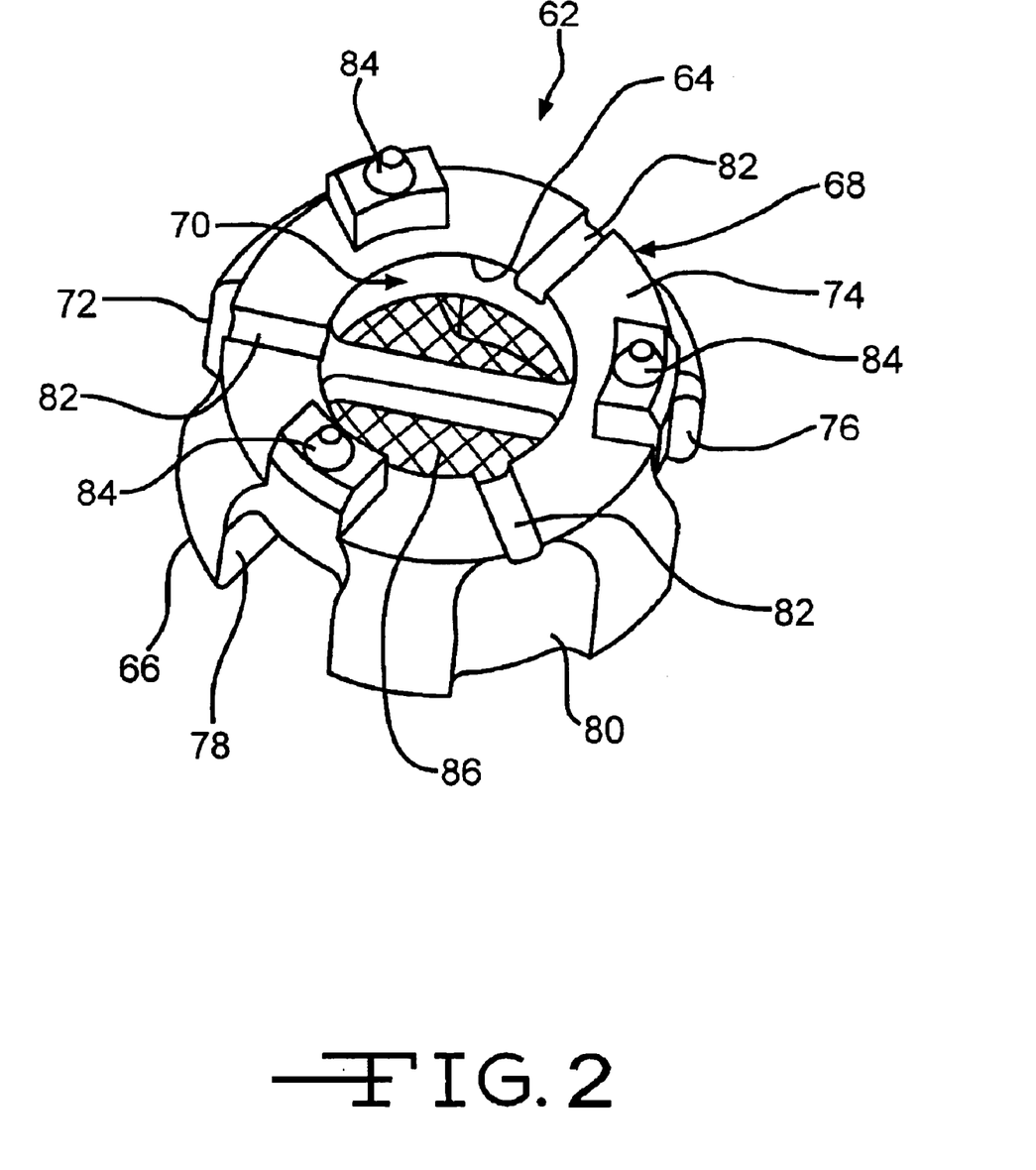
FIG. 2 is an enlarged perspective view of the filter assembly according to the invention, showing the second end of the filter assembly.
Figure 3:
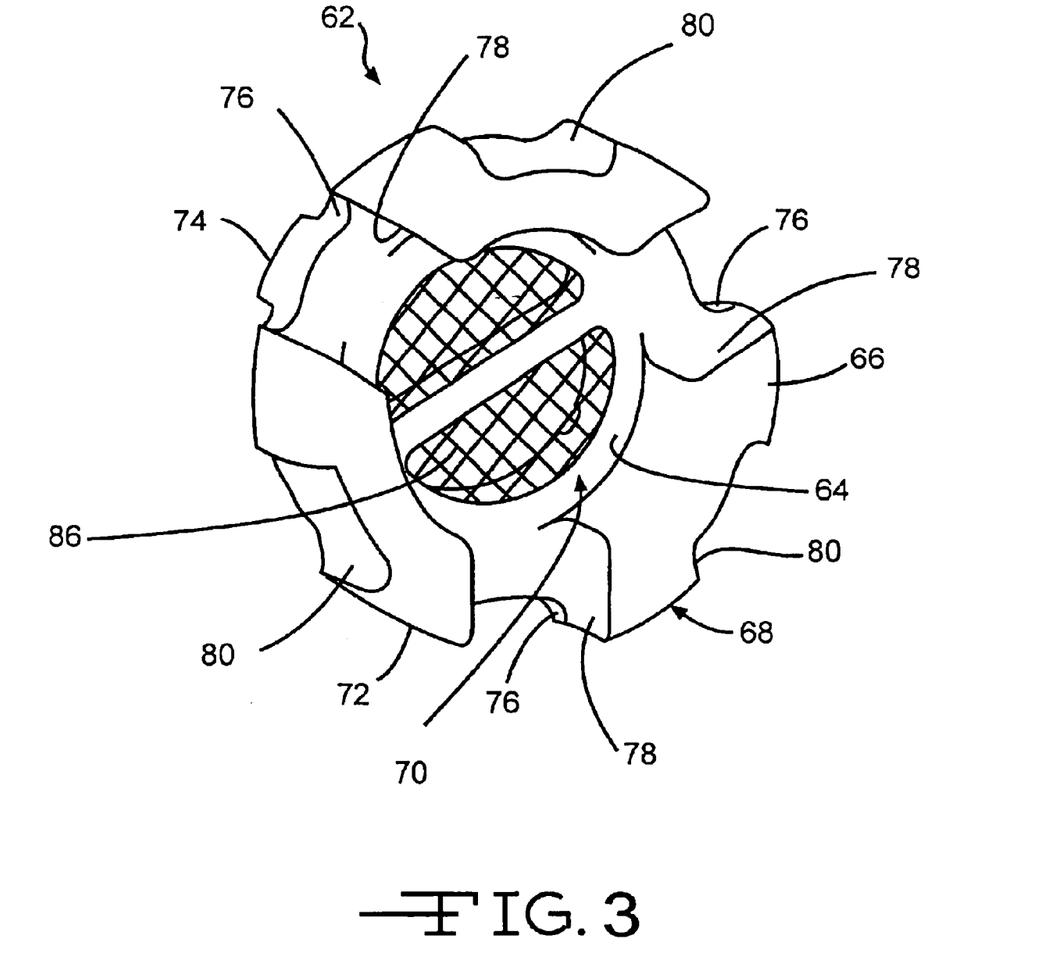
FIG. 3 is an enlarged perspective view of the filter assembly illustrated in FIG. 2, showing the first end of the filter assembly.
Figure 4:
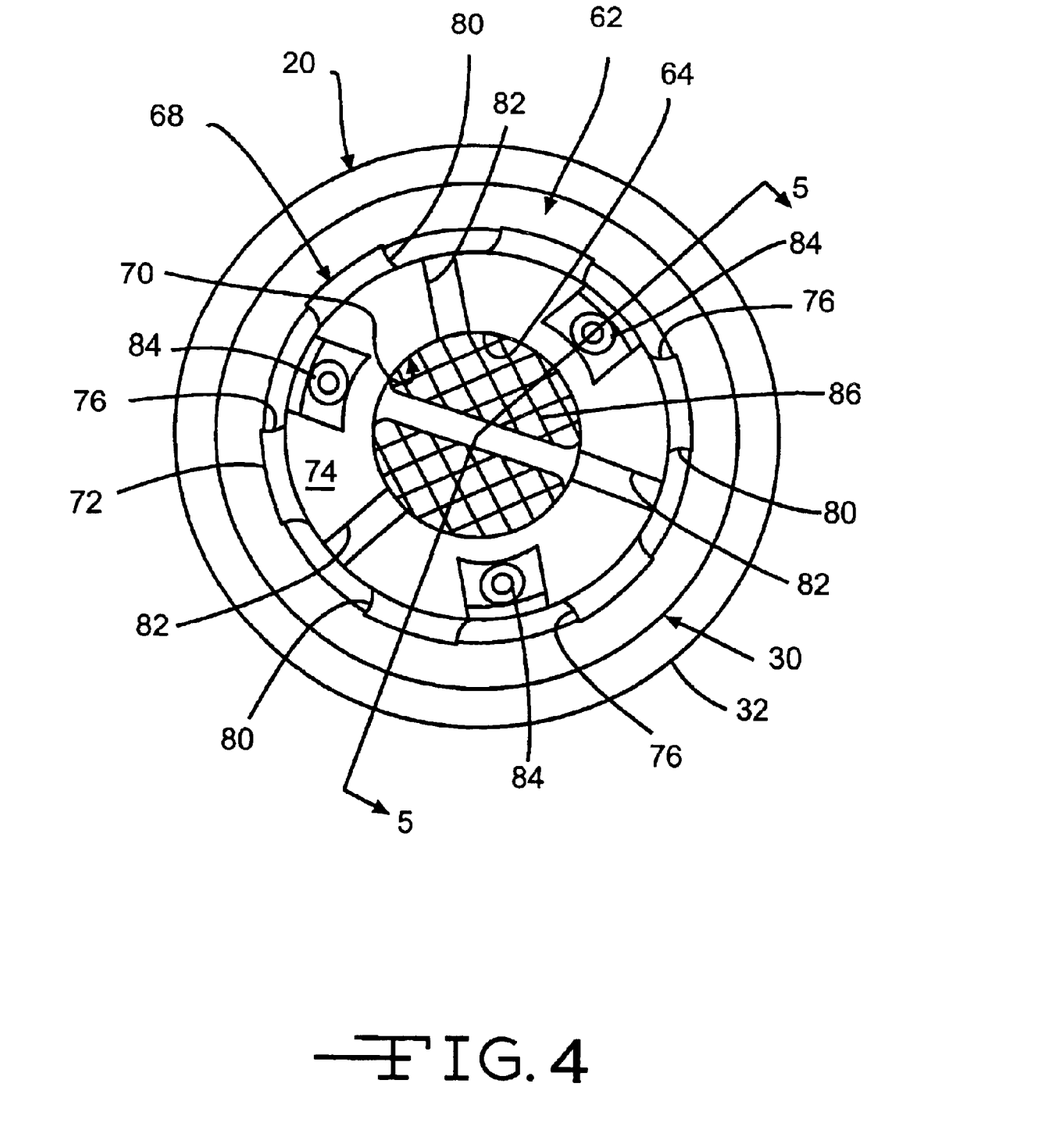
FIG. 4 is a bottom plan view of the filter assembly illustrated in FIG. 2 showing the filter assembly installed on a control valve.

As best shown in FIGS. 2 through 4, the filter assembly 62 includes a substantially annular body 68 having an inner surface 70, an outer surface 72, the first end 66, and a second end 74. The inner surface 70 defines the axial bore 64 which extends from the first end 66 to the second end 74 of the body 68. The outer surface 72 engages a surface of the bore 28 of the housing 19. The diameter of the bore 64 is sized such that the inner surface 70 maintains an interference fit with the reducedw diameter portion 38. Preferably, the filter body 68 is formed of plastic. The plastic material allows the filter body 68 to deflect and thereby conform to the mating reduced diameter portion 38 of the valve seat 34. Advantageously, such an interference fit also holds the filter assembly 62 and the valve seat 34 together during the assembly process.

Figure 6:
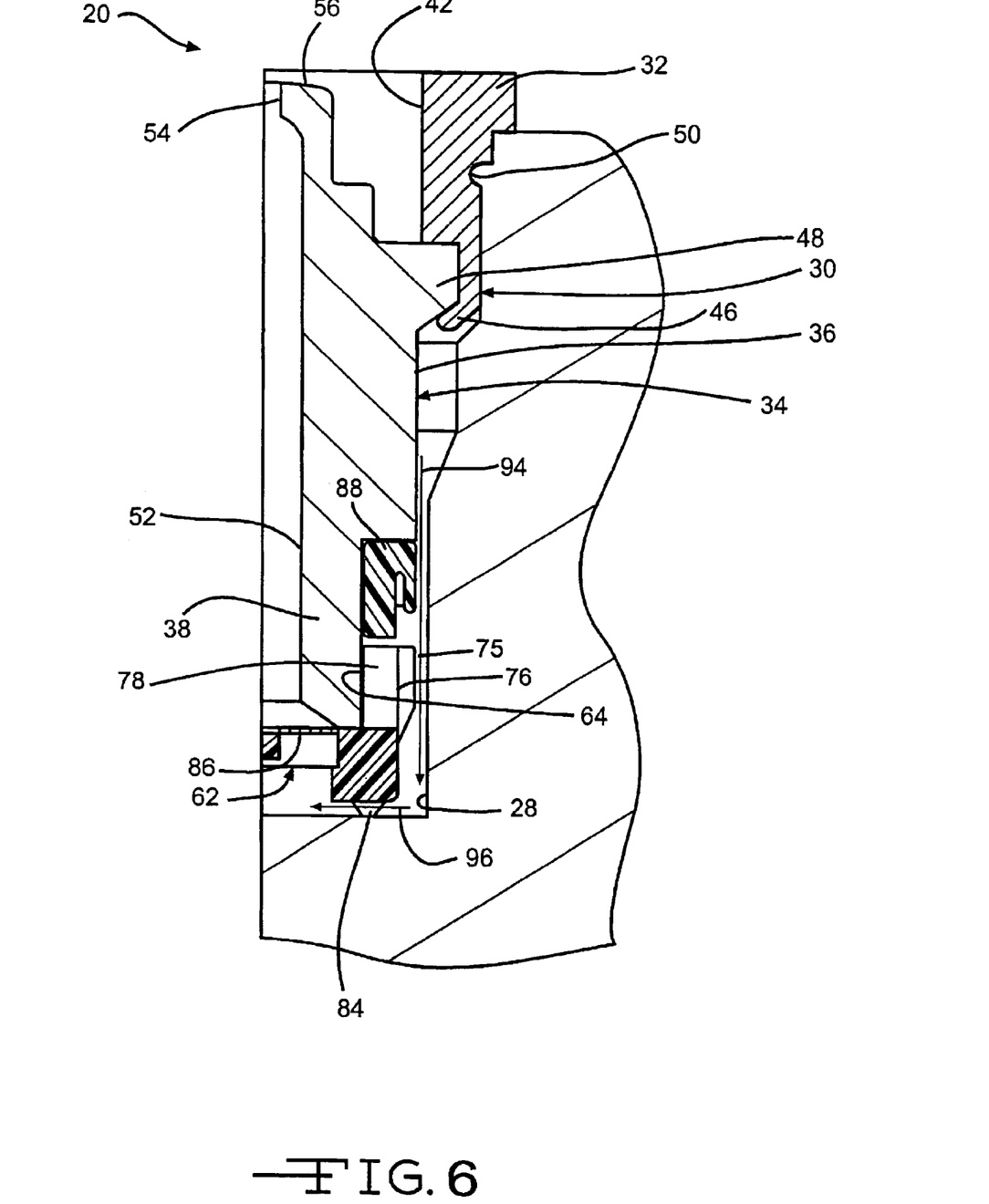
FIG. 6 is an enlarged cross sectional view of the normally open control valve illustrated in FIG. 5, showing the fluid flow path through the first axial groove.

When the filter assembly 62 is installed into the housing 19, a minimum clearance area 75 is formed between the outer surface 72 of the filter assembly 62 and the bore 28. This minimum clearance area 75 ensures that the outside surface 72 does not contact the bore 28 when the control valve 20 is assembled. The clearance area 75 is substantially smaller relative to a thickness of a lip portion 88A of the lip seal 88, thereby ensuring that the lip portion 88A cannot be deformed downwardly (as viewed in FIG. 6) and into the clearance area 75.

A first axial groove 76 is formed in the outer surface 72 of the body 68. In the exemplary embodiment illustrated, three first axial grooves 76 are formed in the outer surface 72. However, it will be appreciated that any desired number of first axial grooves 76 can be formed in the outer surface 72. A first radially extending groove 78 is formed in the first end 66 of the body 68, and extends between the axial bore 64 and the first axial groove 76.

Preferably, a second axial groove 80 is also formed in the outer surface 72 of the body 68. In the exemplary embodiment illustrated, three second axial grooves 80 are formed in the outer surface 72. However, it will be appreciated that any desired number of second axial grooves 80 can be formed in the outer surface 72. A second radially extending groove 82 is formed in the second end 74 of the body 68, and extends between the axial bore 64 and the second axial groove 80.

A boss 84 preferably extends axially from the second end 74 of the body 68. In the exemplary embodiment illustrated, three bosses 84 are extend axially from the second end 74. However, it will be appreciated that any desired number of bosses 84 can be provided. A filter portion 86 is disposed within the axial bore 64 for filtering fluid flowing through the axial bore 64.

Preferably, the bosses 84 are deformable, such that when the filter assembly 62 is installed into the bore 28 of the housing 19, a downward (as viewed in FIGS. 5 and 6) force is applied to the filter assembly 62. Such a downward force deforms the bosses 84, and urges the filter portion 86 and the filter assembly 62 into engagement with the valve seat 34, thereby maintaining an axial interference that keeps the filter portion 86 in contact with the valve seat 34. Although described in the exemplary embodiment as a separate piece, it will be appreciated that the filter portion 86 can be integrally formed with the filter body 68.

Preferably, fluid flow from the brake 16, through a first conduit 90, to the master cylinder 14, through a second conduit 92, is maintained between the lip seal 88 and the bore 28 of the housing 19 during all fluid pressure conditions during brake release. However, it is known that lip seals in known control valves can deform when a substantially high pressure differential exists between the brake 16 and the master cylinder 14, such as, for example, during brake release. When the fluid pressure is substantially higher at the brake 16 relative to the master cylinder 14, for example, within the range of from about 5000 bar per second to about 38,000 bar per second, such a high pressure differential exists. Such deformation of the lip seal can substantially restrict or block the flow of fluid returning from the brake 16 to the master cylinder 14.

Advantageously, the filter assembly 62 provides an economical element that substantially eliminates such restriction of fluid flow when such a high pressure differential exists. When a high pressure differential exists, fluid can continue to flow past an outer surface of the lip seal 88 and through the first and second axial grooves 76 and 80, as shown by the line 94 in FIG. 6. The fluid can also flow radially through the first and second radially extending grooves 78 and 82, such as shown by the line 96. A fluid flow path is thereby defined between the brake 16 and the master cylinder 14, and fluid flow is maintained between the lip seal 88 and the bore 28 of the housing 19 during all fluid pressure conditions during brake release.

Significantly, it has been demonstrated that the first and second radially extending grooves 78 and 82 will not permit the lip seal 88 to seal against the first end 66 of the filter body 68 when a high pressure differential exists. The filter assembly 62 of the invention thereby ensures that there is always an open flow path for fluid.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A filter assembly for a valve, said filter assembly comprising:

a substantially annular filter body having an inner surface, an outer surface, a first end, and a second end, said inner surface defining an axial bore from said first end to said second end, a portion of said axial bore adjacent said first end being adapted to receive a portion of a valve body, said filter body being adapted to be disposed within a bore of a housing containing the valve, said outer surface defining a first axial groove, said first end of said filter body defining a first radially extending groove, said first radially extending groove extending between said axial bore and said first axial groove; and a filter portion disposed within said axial bore for filtering fluid flowing through said axial bore.

2. The filter assembly according to claim 1, wherein said outer surface further defines a second axial groove.

3. The filter assembly according to claim 2, wherein said second end of said filter body defines a second radially extending groove, said second radially extending groove extending between said axial bore and said second axial groove.

4. The filter assembly according to claim 1, wherein said filter assembly further includes a boss extending axially from said second end of said filter body, said boss being adapted to engage a bore of a housing.

5. The filter assembly according to claim 4, wherein said boss is deformable.

6. The filter assembly according to claim 1, wherein said first axial groove defines a fluid flow path between a vehicle brake and a vehicle master cylinder, and wherein fluid flow is maintained during all conditions during brake release.

7. The filter assembly according to claim 6, wherein said first end of said filter body is disposed adjacent a lip seal, the lip seal being adapted to be disposed about a portion of a valve body.

8. A filter assembly for a valve, said filter assembly comprising:

a substantially annular filter body having an inner surface, an outer surface, a first end, and a second end, said inner surface defining an axial bore from said first end to said second end, a portion of said bore adjacent said first end receiving a portion of a valve body, said filter body disposed within a bore of a housing, said outer surface defining a first axial groove and a second axial groove, said housing containing a valve, said first end of said filter body defining a first radially extending groove, said first radially extending groove extending between said axial bore and said first axial groove, said second end of said filter body defining a second radially extending groove, said second radially extending groove extending between said axial bore and said second axial groove;

a deformable boss extending axially from said second end of said filter body, said boss engaging a portion of said bore of said housing; and a filter portion disposed within said axial bore for filtering fluid flowing through said axial bore;

wherein said first axial groove defines a fluid flow path between a vehicle brake and a vehicle master cylinder, and wherein fluid flow is maintained during all conditions during brake release.

9. A control valve for controlling fluid flow in a hydraulic control unit, said control valve comprising:

a valve body, said valve body comprising a first body portion and a second body portion adjacent said first body portion, a valve bore being formed through said first and said second body portions;

an armature slidably received in said valve bore of said first body portion;

an electrical coil disposed about said valve body for selectively inducing a magnetic flux in said armature; and a filter assembly adjacent said second body portion, said filter assembly for filtering fluid introduced into said valve bore of said second body portion, said filter assembly comprising:

a substantially annular filter body having an inner surface, an outer surface, a first end, and a second end, said inner surface defining an axial bore from said first end to said second end, said filter body disposed within a bore of a housing, said outer surface defining a first axial groove, said housing containing said valve body, said first end of said filter body defining a first radially extending groove, said first radially extending groove extending between said axial bore and said first axial groove; and a filter portion disposed within said axial bore for filtering fluid flowing through said axial bore.

10. The control valve according to claim 9, including a sealing member disposed within said valve bore about said second body portion for sealing between said second body portion and said housing.

11. The control valve according to claim 10, wherein said sealing member is a lip seal.

12. The control valve according to claim 9, wherein said sealing member defines a fluid flow path between a vehicle brake and a vehicle master cylinder, and wherein fluid flow is maintained between said sealing member and said housing during all conditions during brake release.

13. The control valve according to claim 9, wherein said outer surface further defines a second axial groove.

14. The control valve according to claim 13, wherein said second end of said filter body defines a second radially extending groove, said second radially extending groove extending between said axial bore and said second axial groove.

15. The control valve according to claim 9, wherein said filter assembly further includes a boss extending axially from said second end of said filter body, said boss engaging a portion of said bore of said housing.

16. The control valve according to claim 15, wherein said boss is deforniable.

17. The control valve according to claim 9, wherein said first axial groove defines a fluid flow path between a vehicle brake and a vehicle master cylinder, and wherein fluid flow is maintained during all conditions during brake release.

18. A hydraulic control unit (HCU) for a vehicle brake system comprising:
an HCU housing defining an HCU bore; and
a control valve mounted in said HCU housing, said control valve including:
a valve body, said valve body comprising a first body portion and a second body portion adjacent said first body portion, a valve bore being formed through said first and said second body portions;
an armature slidably received in said valve bore of said first body portion; an electrical coil disposed about said valve body for selectively inducing a magnetic flux in said armature; and
a filter assembly adjacent said second body portion, said filter assembly for filtering fluid introduced into said valve bore of said second body portion, said filter assembly comprising:
a substantially annular filter body having an inner surface, an outer surface, a first end, and a second end, said inner surface defining an axial bore from said first end to said second end, a portion of said bore adjacent said first end receiving a portion of said second body portion, said filter body disposed within said HCU bore of said HCU housing, said outer surface defining a first axial groove, said first end of said filter body defining a first radially extending groove, said first radially extending groove extending between said axial bore and said first axial groove; and
a filter portion disposed within said axial bore for filtering fluid flowing through said axial bore.

19. The HCU according to claim 18, including a sealing member disposed within said valve bore about said second body portion for sealing between said second body portion and said HCU housing.

20. The HCU according to claim 19, wherein said sealing member is a lip seal.

21. The HCU according to claim 18, wherein said sealing member defines a fluid flow path between a vehicle brake and a vehicle master cylinder, and wherein fluid flow is maintained between said sealing member and said housing during all conditions during brake release.

22. The HCU according to claim 18, wherein said outer surface further defines a second axial groove.

23. The HCU according to claim 22, wherein said second end of said filter body defines a second radially extending groove, said second radially extending groove extending between said axial bore and said second axial groove.

24. The HCU according to claim 18, wherein said filter assembly further includes a boss extending axially from said second end of said filter body, said boss engaging a portion of said HCU bore of said HCU housing.

25. The HCU according to claim 24, wherein said boss is deformable.

26. The HCU according to claim 18, wherein said first axial groove defines a fluid flow path between a vehicle brake and a vehicle master cylinder, and wherein fluid flow is maintained during all conditions during brake release.

* * * * *